(12) United States Patent
Yamada

(10) Patent No.: US 6,533,698 B1
(45) Date of Patent: Mar. 18, 2003

(54) HIGH BIAS DIFFERENTIAL LOCK

(75) Inventor: Silvio M. Yamada, Gahanna, OH (US)

(73) Assignee: Meritor Heavy Vehicle Technology, LLC, Troy, MI (US)

(*) Notice: Subject to any disclaimer, the term of this patent is extended or adjusted under 35 U.S.C. 154(b) by 0 days.

(21) Appl. No.: 09/603,402

(22) Filed: Jun. 26, 2000

(51) Int. Cl.$^7$ ................................................ F16H 48/20

(52) U.S. Cl. .......................... 475/231; 475/89; 475/93; 475/249

(58) Field of Search ................................ 475/89, 91, 93, 475/95, 231, 240, 241, 249, 94, 84, 88, 86

(56) References Cited

U.S. PATENT DOCUMENTS

| | | | | |
|---|---|---|---|---|
| 3,448,636 A | * | 6/1969 | Roper et al. | 475/240 |
| 3,762,241 A | * | 10/1973 | Roper | 475/240 |
| 4,914,980 A | * | 4/1990 | Taureg et al. | 475/89 |
| 5,194,053 A | * | 3/1993 | Sano et al. | 475/89 |

FOREIGN PATENT DOCUMENTS

| | | | | |
|---|---|---|---|---|
| WO | | 8706668 | * 11/1987 | 475/89 |

* cited by examiner

Primary Examiner—Sherry Estremsky
Assistant Examiner—Ha Ho
(74) Attorney, Agent, or Firm—Carlson, Gaskey & Olds

(57) ABSTRACT

An improved differential lock is self-setting. A movable lock member is driven to reciprocate between two hydraulic chambers at a speed which increases when there is increasing relative movement between a shaft and differential case. As the movable lock member increases its speed, the resistance to further movement of the lock member due to the hydraulic fluid increases. Preferably, the movable lock member has a pin received in a cam groove in the shaft, and another pin received at an axial groove in the case. The movable lock member is thus constrained to rotate with the case, and is caused to reciprocate as the pin moves within the cam groove in the shaft. A fluid passage through the lock member allows fluid to move between the opposed hydraulic chambers. However, a valve closes this passage as the movable lock member increases its speed. As the passage is restricted, the hydraulic fluid resists further movement of the lock member. As the lock member slows, it will in turn cause the shaft and case to rotate at a more equal speed.

21 Claims, 2 Drawing Sheets

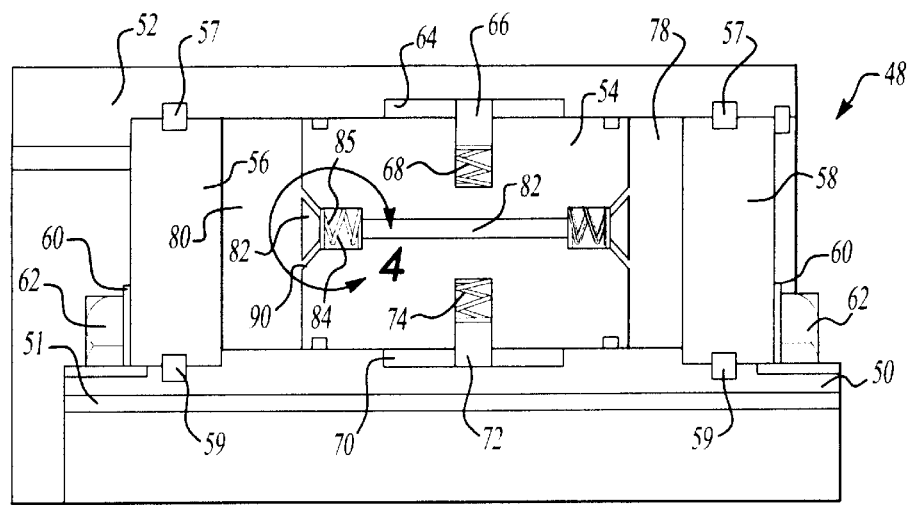
Fig-2
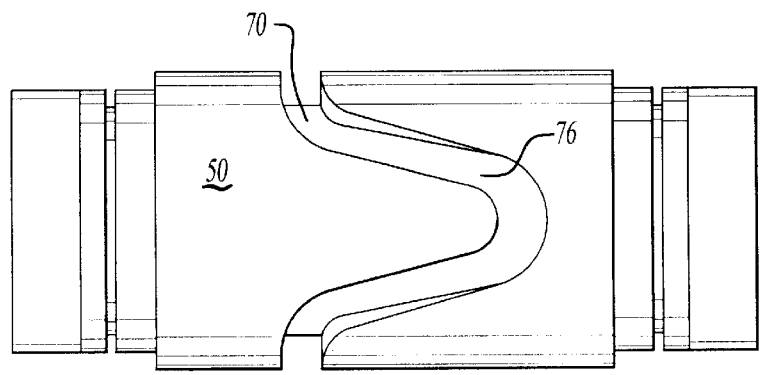
Fig-3
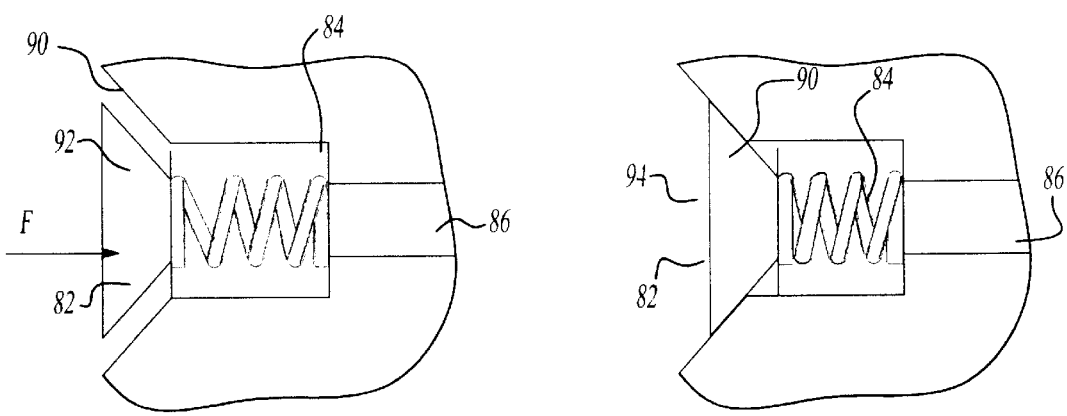
Fig-4
Fig-5

HIGH BIAS DIFFERENTIAL LOCK

BACKGROUND OF THE INVENTION

This invention relates to a lock for a differential which is self-setting.

Differentials are utilized to provide rotational drive to two separate shafts. The differential allows the two shafts to rotate at different speeds relative to each other. Typically, a differential case surrounds the two shafts, and a single drive input comes into the differential. At least one, and typically two, outputs are driven by the differential. The differential allows relative rotation between the outputs.

Under certain conditions, it is desirable to prevent or limit any relative rotation between the two shafts. As an example, the two shafts often drive the two wheels on an axle of a vehicle. Relative rotation can occur during turning, and is desirable. However, relative rotation can also occur such as when one of the wheels is slipping on ice. In such circumstances, it may be undesirable to have relative rotation. Thus, differentials are often provided with a lock feature. Typically this lock feature is manually actuated to prevent relative rotation. In this way, a slipping wheel will be forced to rotate at the same speed as the other wheel. The manually actuated locks have some drawbacks. They are driver skill and attention dependent. Thus, at times, a driver may not always have engaged the lock at a proper time. This may have caused unnecessary wear or damage to components. The same could happen if the driver does not disengage the lock at an appropriate time.

Differential locks have also been proposed which rely on exotic fluids which increase viscosity under certain circumstances.

There are also ms which are known as limited slip differentials. These are typically internal to the differential gears, and also have limitations. These systems typically use friction plates to create resistance to a relative speed of the axle shafts. A disadvantage of these systems is that they are constantly active regardless of relative speed or road condition. They are also dependent on the initial preload of the internal system, and some are operating torque dependent to produce torque in poor road conditions. Thus, these systems can only deliver low torque output when most needed (under extreme road conditions) to avoid detrimental effects to the normal vehicle performance. That is, the system must be set up such that it only becomes effective under extreme conditions, otherwise normal operation will be affected. Further, these systems have high wear of the friction materials and relatively high noise.

In general, the known differentials have required manual actuation and have been relatively complex and expensive. The fluid-based differential lock requires an exotic fluid, and is also not as effective as would be desirable.

SUMMARY OF THE INVENTION

In a disclosed embodiment of this invention, a differential lock member is moved at a speed dependent on the relative rotation between two components of a differential. As the lock member increases its speed, a fluid resists movement of the lock member. Thus, there is more resistance to movement of the lock member. As the lock member begins to move at a slower rate, it will cause the two differential components to rotate at a more equal speed. That is, as the lock member has its movement slowed, it will tend to cause the two differential components to rotate at a more equal speed.

In embodiments of this invention, the lock member is positioned between an inner shaft and the differential case at an outer peripheral surface. The lock member is driven axially along a shaft axis as the relative rotation between the shaft and the case increases. In preferred embodiments the lock member has a fluid path through its length. As the lock member is moved axially, it is forced against fluid chambers on each end. Fluid passes between the two chambers through the passage as the moving lock member moves within the chambers. A valve is preferably mounted on the passage. As the moving lock member increases its speed, the valve tends to close the passage. Thus, as the moving lock member increases its speed due to increasing relative rotation between the shaft and the case, the valve will limit flow of fluid. As the flow of fluid through the passage is limited, the ability of the lock member to move is also limited. As the lock member slows, it will tend to drive the shaft and case at a more equal speed together. In a most preferred embodiment, the valve is spring biased outwardly of the passage and forced into the passage by the fluid pressure. As the speed of the lock member increases, so will the fluid pressure acting on the valve.

In a preferred embodiment of this invention, the moving lock member is driven to move axially by relative rotation between the shaft and differential case by having a pin at one surface engaged in a axial groove in one of the case and shaft, and a pin in the other of the case and groove engaged in a cam. When there is relative rotation, the pin moves in the cam, which causes the lock member to move axially. Preferably, the cam is formed in the outer periphery of the shaft. Thus, as the shaft rotates relative to the case, the lock member moves axially and is constrained to rotate with the case.

In other features of this invention, the movable lock member is generally tubular in shape, and surrounds the shaft. These and other features of the present invention can be best understood from the following specification and drawings, the following of which is a brief description.

BRIEF DESCRIPTION OF THE DRAWINGS

FIG. 2 is a cross-sectional view through an inventive differential lock.

FIG. 3 is a view of one portion of the lock of FIG. 2.

FIG. 4 shows a valve in a first position.

FIG. 5 shows a valve in a locking position.

DETAILED DESCRIPTION OF A PREFERRED EMBODIMENT

Figure 1:
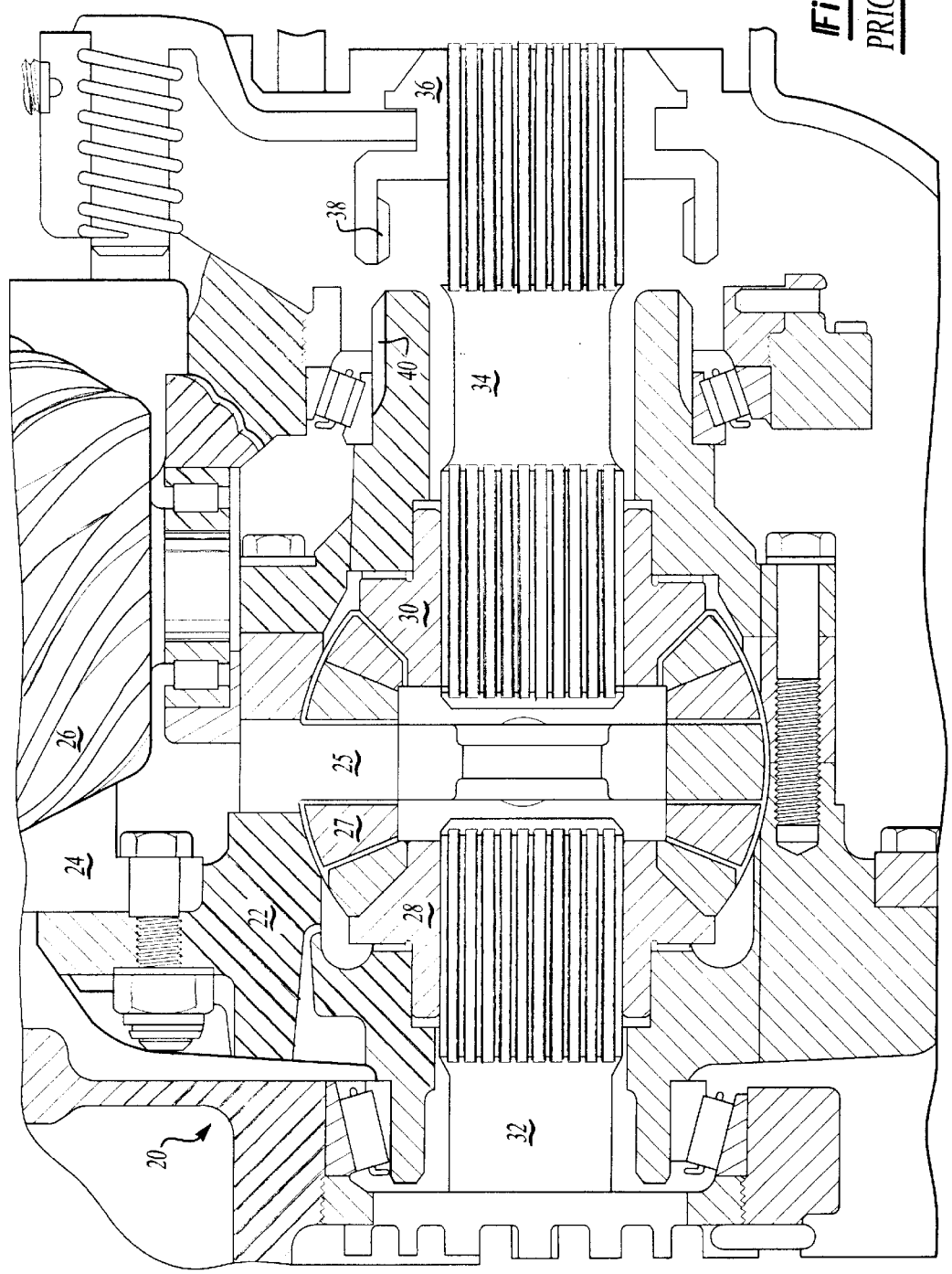
FIG. 1 is a view of a prior art differential.

A differential 20 is illustrated in FIG. 1 is of the known type which distributes a drive input to a pair of spaced wheels. A differential case 22 receives a ring gear 24 which is driven by a bevel pinion 26. As the case 22 rotates, it rotates differential shafts 25 which in turn cause differential pinions 27 to roll alongside differential side gears 28 and 30. Side gears 28 and 30 cause respective shafts 32 and 34 to rotate. At some point, an operator may desire to eliminate relative rotation between the shafts 32 and 34. A lock 36 is actuated to bring teeth 38 into engagement with teeth 40 on the case 22. When this occurs, the case 22 is constrained to rotate with the shaft 34. This will then cause the shafts 32 and 34 to rotate at the same speed. Although one type of differential is shown, the invention extends to other types, such as interaxles, etc.

As shown in FIG. 2, the present invention eliminates this manually set sliding lock with a self-actuating lock 48.

While the term "lock" is utilized to describe this embodiment, in fact the embodiment will not necessarily lock the differential case to the shaft for completely eliminating relative rotation. Instead, the "lock" as utilized in this application limits relative rotation.

As shown, an inner cam 50 is splined at 51 to be received on a shaft such as shaft 34. An outer sleeve 52 is connected to a differential case in any known fashion. A lock member 54 is mounted between the sleeve 52 and the cam 50. In the half cross-section of FIG. 2, one only sees the upper portion of the system 48. However, it should be understood that there is preferably a mirror image below the view of FIG. 2, and that the member 54 is generally ring shaped or tubular.

End plates 56 and 58 are mounted between shaft 50 and case 52. Seals 57 and 59 seal the interface between the members and the plates. A washer 60 and nut 62 secure the plates together, locking the plate to rotate with the cam 50. Nut 62 is secured by threads 63 on shaft 50. A plurality of circumferentially spaced grooves 64, only one of which is shown, extend within the inner periphery of the sleeve 52. A pin 66 is spring biased at 68 from the lock member 54 into the groove 64. Again, there may be a plurality of circumferentially spaced pins 66. A cam groove 70 is formed in the cam 50. A pin 72 is spring biased 74 into the groove 70. Again, there may be a plurality of pins 72.

As can be appreciated from FIG. 2, the groove 70 has a sinusoidal shape with an extreme 76 and other extremes 78. As can be appreciated by those with skill in the mechanical arts, as pin 72 moves within the cam groove 70, it will reverse axial movement of the lock member 54 as it reaches the extreme 76 and 78. The lock member 54 is caused to move axially since it is constrained from rotating relative to the sleeve 52.

A pair of fluid chambers 79 and 80 are defined at each end of the lock member 54. Valves 82 are attached to springs 84 at each end of the fluid passage 86 through the lock member 54. The spring 84 is mounted within a chamber 85 formed at each end of the passage 86.

As shown in FIG. 4, preferably the spring 84 forces the valve 82 outwardly away from a valve seat 90. The valve is shown in an open position 92 at which fluid is allowed to flow between the valve and its seat 90 and into the passage 86. As shown, valve 82 and seat 90 are generally frusto-conical in shape.

As relative rotation occurs between the cam 50 and the sleeve 52, the lock member 54 is driven axially between the chambers 79 and 80. Since the valve 82 is in the position shown in FIG. 4, fluid is allowed to move through the passage 86. It should be understood that an incompressible hydraulic fluid is preferably in the chambers 79 and 80, and thus if it is not allowed to flow through the passages, the fluid limits movement of the lock member 54. Further, as the lock member 54 begins to increase its speed, the pressures it faces from the fluid in the chambers 79 and 80 increases. As shown in FIG. 5, as the fluid pressure F increases, it begins to force the valve 82 against the seat 90. Thus, the valve 82 is moved to a position such as shown at 94 at which it greatly restricts the flow of fluid into the passage 86. Once this position is reached, the fluid in the chamber 79 and 80 will resist movement of the lock member 54. If the lock member 54 is prevented from moving axially, then it will tend to cause the cam 50 to rotate along with the sleeve 52 at a single speed.

Stated another way, the movement of the lock member 54 increases as the relative speed between the cam 50 and the sleeve 52 increases. However, as the speed of the lock member 54 increases, the resistance to movement of the lock member 54 also increases. This increasing resistance prevents the members 50 and 52 from rotating relative to each other, or at least slow the relative rotation. In this way, the system 48 essentially acts as a self setting differential lock. Moreover, the system is relatively robust and simple when compared to prior art.

Preferred embodiments of this invention have been disclosed; however, a worker of ordinary skill in this art would recognize that certain modifications would come within the scope of this invention. For that reason, the following claims should be studied to determine the true scope and content of this invention.

What is claimed is:

1. A differential comprising:
   first shaft;
   a case;
   a moveable lock member positioned between said case and said first shaft, said movable lock member being movable at a speed dependent upon a relative speed between said shaft and said case, and movement of said movable lock member being resisted as the speed of said movable lock member increases, said movable lock member always being constrained against any relative rotation between one of said case and said first shaft, under all operative conditions.

2. A differential as recited in claim 1, wherein said movable lock member moves within a pair of spaced chambers filled with hydraulic fluid.

3. A differential as recited in claim 1, wherein said moveable lock member is generally cylindrical and surrounds said shaft.

4. A differential as recited in claim 1, wherein plates close off a pair of opposed fluid chambers on each side of said movable lock member.

5. A differential as recited in claim 1, wherein said movable lock member is constrained from rotating relative to said differential case.

6. A differential comprising:
   a first shaft;
   a case;
   a moveable lock member positioned between said case and said first shaft, said movable lock member being movable at a speed dependent upon a relative speed between said shaft and said case, and movement of said movable lock member being resisted as the speed of said movable lock member increases;
   said movable lock member being movable within a pair of spaced chambers filled with hydraulic fluid; and
   at least one fluid passage extends through said movable lock member.

7. A differential as recited in claim 6, wherein at least one valve is positioned in said passage.

8. A differential as recited in claim 7, wherein there are a pair of spaced valves mounted in said passage.

9. A differential as recited in claim 7, wherein a spring forces said valve to an open position, and fluid pressure in at least one of said chambers moves said valve to a closed position.

10. A differential as recited in claim 7, wherein said valve is generally frustro-conical.

11. A differential comprising:
   a first shaft;
   a case;
   a moveable lock member positioned between said case and said first shaft, said movable lock member being movable at a speed dependent upon a relative speed between said shaft and said case, and movement of said movable lock member being resisted as the speed of said movable lock member increases; and grooves and a pin connecting said movable lock member to one of said case and said first shaft, and a cam groove and at least one pin connecting said lock member to the other of said differential and said shaft.

12. A differential as recited in claim 11, wherein said cam groove is associated with said shaft.

13. A differential comprising:

a first shaft;

a second shaft;

a case;

a moveable lock member positioned between said case and said first shaft, said movable lock member being movable at a speed dependent upon a relative speed between said first shaft and said case, and movement of said movable lock member being resisted as the speed of said movable lock member increases to cause said first and second shaft to rotate at more equal speeds, said movable lock member moves within a pair of spaced chambers filled with hydraulic fluid, and at least one fluid passage extending through said movable lock member.

14. A differential as recited in claim 13, wherein at least one valve is positioned in said passage.

15. A differential as recited in claim 13, wherein there are grooves and a pin connecting said movable lock member to one of said case and said first shaft, and a cam groove and at least one pin connecting said lock member to the other of said differential and said first shaft.

16. A differential as recited in claim 15, wherein said cam is associated with said shaft.

17. A differential as recited in claim 13, wherein said moveable lock member is generally cylindrical and surrounds said shaft.

18. A differential as recited in claim 13, wherein there are a pair of spaced valves mounted in said passage.

19. A differential as recited in claim 13, wherein a spring forces said valve to an open position, and fluid pressure in at least one of said chambers moves said valve to a closed position.

20. A differential as recited in claim 13, wherein plates close off a pair of opposed fluid chambers on each side of said movable lock member.

21. A differential as recited in claim 20, wherein said plates are fixed to said first shaft.

* * * * *